US010328824B2

(12) United States Patent
Dow et al.

(10) Patent No.: US 10,328,824 B2
(45) Date of Patent: *Jun. 25, 2019

(54) VEHICLE OPERATIONS BASED ON BIOMETRIC FINGERPRINT ANALYSIS (71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Tynan J. Garrett, Poughkeepsie, NY (US); Emily M. Metruck, Poughkeepsie, NY (US); Charles J. Stocker, IV, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/434,203

(22) Filed: Feb. 16, 2017

(65) Prior Publication Data

US 2017/0158149 A1 Jun. 8, 2017

Related U.S. Application Data (63) Continuation of application No. 14/931,401, filed on Nov. 3, 2015, now Pat. No. 9,677,894, which is a
(Continued)

(51) Int. Cl.
*B60N 2/02* (2006.01)
*B60R 16/037* (2006.01)
(Continued)

(52) U.S. Cl.
CPC ......... *B60N 2/0248* (2013.01); *B60G 17/015* (2013.01); *B60H 1/00735* (2013.01);
(Continued)

(58) Field of Classification Search
CPC ................ B60N 2/0248; B60N 2/0224; B60H 1/00742; B60H 1/00971; B60H 1/00735;
(Continued)

(56) References Cited

U.S. PATENT DOCUMENTS 5,686,765 A 11/1997 Washington
6,100,811 A 8/2000 Hsu et al.
(Continued)

FOREIGN PATENT DOCUMENTS

EP 1113405 B1 4/2010
WO 9743151 A1 11/1997
WO 2011127459 A1 10/2011

OTHER PUBLICATIONS

P. Gnanasivam and S. Muttan, "Estimation of Age through Fingerprints Using Wavelet Transform and Singular Value Decomposition," International Journal of Biometrics and Bioinformatics, vol. 6, Issue 2, pp. 58-67 (2012) (Year: 2012).*
(Continued)

*Primary Examiner* — Peter D Nolan
(74) *Attorney, Agent, or Firm* — Daniel R. Simek (57) ABSTRACT

Embodiments of the present invention provide a method and system for enacting various driving profiles based on identifying the age and gender of the user. Initially, identifying information is acquired from a user of a vehicle. An identification program determines whether the driver is known, by comparing the identifying information to a set of stored identifying information. If the driver of the vehicle is known, as the identifying information from the user is similar to stored identifying information, then a specific driver profile associated with the specific driver is activated. If the driver is not known, as the identifying information from the user of the vehicle is not similar to the stored identifying information, then the age and gender of the user
(Continued)

of the vehicle is determined. Based on the determined age and gender of the driver of the vehicle, various vehicle setting ranges are enacted.

13 Claims, 3 Drawing Sheets

Related U.S. Application Data continuation of application No. 14/834,751, filed on Aug. 25, 2015, now Pat. No. 9,619,638.

(51) Int. Cl.
| | | |
|---|---|---|
| *G07C 9/00* | (2006.01) | |
| *G06F 21/32* | (2013.01) | |
| *B60G 17/015* | (2006.01) | |
| *B60H 1/00* | (2006.01) | |
| *B60R 25/25* | (2013.01) | |
| *F02D 29/02* | (2006.01) | |
| *G06F 21/83* | (2013.01) | |
| *B60W 40/08* | (2012.01) | |
| *F02D 41/22* | (2006.01) | |

(52) U.S. Cl.
CPC ..... *B60H 1/00742* (2013.01); *B60H 1/00971* (2013.01); *B60N 2/0224* (2013.01); *B60R 16/037* (2013.01); *B60R 25/252* (2013.01); *F02D 29/02* (2013.01); *G06F 21/32* (2013.01); *G06F 21/83* (2013.01); *G07C 9/00158* (2013.01); *B60G 2400/00* (2013.01); *B60G 2401/00* (2013.01); *B60G 2401/19* (2013.01); *B60W 2040/0809* (2013.01); *B60W 2040/0881* (2013.01); *F02D 2041/227* (2013.01); *F02D 2200/60* (2013.01); *F02D 2200/702* (2013.01); *G06F 2221/2149* (2013.01)

(58) Field of Classification Search
CPC .............. G07C 9/00158; B60R 16/037; B60R 25/252; B60W 2040/0881; B60W 2040/0809; F02D 2041/227; F02D 2200/60; F02D 2200/702; F02D 29/02; G06F 2221/2149; G06F 21/83; G06F 21/32; B60G 2401/19; B60G 2401/00; B60G 2400/00; B60G 17/015
See application file for complete search history.

(56) References Cited

U.S. PATENT DOCUMENTS

| | | | |
|---|---|---|---|
| 6,727,800 B1 | 4/2004 | Dutu | |
| 6,810,309 B2 | 10/2004 | Sadler et al. | |
| 7,042,347 B2 | 5/2006 | Cherouny | |
| 8,965,621 B1* | 2/2015 | Urmson | G05D 1/0055 701/23 |
| 9,315,151 B2 | 4/2016 | Taylor et al. | |
| 2006/0052909 A1 | 3/2006 | Cherouny | |
| 2008/0252412 A1 | 10/2008 | Larsson et al. | |
| 2010/0097178 A1 | 4/2010 | Pisz et al. | |
| 2010/0222939 A1 | 9/2010 | Namburu et al. | |
| 2013/0083975 A1 | 4/2013 | Partington et al. | |
| 2013/0086090 A1 | 4/2013 | Partington et al. | |
| 2014/0002237 A1 | 1/2014 | Infante et al. | |
| 2014/0278586 A1 | 9/2014 | Sanchez et al. | |
| 2014/0282931 A1 | 9/2014 | Protopapas | |
| 2014/0309862 A1 | 10/2014 | Ricci | |
| 2014/0310031 A1 | 10/2014 | Ricci | |
| 2014/0310788 A1 | 10/2014 | Ricci | |
| 2015/0106001 A1 | 4/2015 | Lee et al. | |
| 2015/0149017 A1* | 5/2015 | Attard | B60W 30/182 701/23 |
| 2015/0175070 A1 | 6/2015 | Attard et al. | |
| 2015/0213555 A1 | 7/2015 | Barfield, Jr. et al. | |
| 2015/0266455 A1* | 9/2015 | Wilson | G09B 19/10 701/93 |
| 2016/0001781 A1 | 1/2016 | Fung et al. | |

OTHER PUBLICATIONS

IBM Appendix P: "List of IBM Patents or Patent Applications Treated as Related", dated Feb. 16, 2017, 2 pages.
Gnanasivam et al.; "Estimation of Age Through Fingerprints Using Wavelet Transform and Singular Value Decomposition"; International Journal of Biometrics and Bioinformatics (IJBB); Apr. 16, 2012; pp. 58-67; vol. 6; Issue 2; CSC Journals; Kuala Lumpur, Malaysia.
Gnanasivam et al.; "Fingerprint Gender Classification using Wavelet Transform and Singular Value Decomposition"; IJCSI International Journal of Computer Science Issues; Mar. 2012; pp. 274-282; vol. 9; Issue 2; No. 3.
Sheik-Nainar; "Fingerprint Swipe Sensor and Button Layout"; An IP.com Prior Art Database Technical Disclosure; IP.com No. 000237347; Jun. 13, 2014; pp. 1-2.
"Method and device for automatically identifying an individual container"; An IP.com Prior Art Database Technical Disclosure; IP.com No. 000209820; Aug. 17, 2011; pp. 1-4.
"Methods of Using Biometrics to Authenticate Users"; An IP.com Prior Art Database Technical Disclosure; IP.com No. 000216429; Apr. 5, 2012; 10 pages.
Dow et al., "Vehicle Operations Based on Biometric Fingerprint Analysis", U.S. Appl. No. 14/834,751, filed Aug. 25, 2015, pp. 1-23.
Dow et al., "Vehicle Operations Based on Biometric Fingerprint Analysis", U.S. Appl. No. 14/931,401, filed Nov. 3, 2015, pp. 1-19.
Sawyer et al., "DriveID: safety innovation through individuation," In Proc. 18th World Congress on Ergonomics, vol. 41, pp. 4273-4278, 2012.

\* cited by examiner

VEHICLE OPERATIONS BASED ON BIOMETRIC FINGERPRINT ANALYSIS

BACKGROUND OF THE INVENTION

The present invention relates generally to the field of operating of a vehicle and, in particular, controlling certain vehicle specifications based on a user's biometric fingerprint identification.

Biometric identifiers are the distinctive, measurable characteristics used to label and describe individuals. Fingerprints are one of many forms of biometrics used to identify individuals and verify their identity. Fingerprint identification refers an automated method of verifying a match between two human fingerprints. Fingerprint identification is used for numerous applications, for example, accessing control on computerized systems or on portable media, for time and attendance management, and for physical access control, such as fingerprint locks on doors and safes.

Similarly to biometrics, virtually all vehicles have a unique key used to activate or enable the ignition system, as well as unlock other aspects of the vehicle. A smart key allows a driver to keep the key fob pocketed when starting the vehicle. Vehicles with a smart key system can activate the ignition without inserting a key in the ignition, provided the driver has the key inside the vehicle. On newer-generation vehicles, cars are provided with an engine start button for starting the car by simply pushing a button. Further, some vehicles automatically adjust various settings based on the smart key used to start the engine. For example, common automatic adjustments are a specific seat position, steering wheel position, exterior mirror position, climate control temperature settings, and stereo presets.

SUMMARY

According to one embodiment of the present invention, a method for enacting a driving profile based on identifying information of the user, the method comprising: receiving, by one or more processors, identifying information from a user of a vehicle, wherein the identifying information comprises a fingerprint; determining, by one or more processors, whether the received identifying information, from the user of the vehicle, is similar to a set of stored identifying information; in response to determining the identifying information, from the user of the vehicle, is not similar to the set of stored identifying information, determining, by one or more processors, an age and a gender of the user of the vehicle, based on the received identifying information; and activating, by one or more processors, a set of vehicle setting ranges, wherein the set of vehicle setting ranges are based on the determined age and gender of the user of the vehicle.

Another embodiment of the present invention provides a computer program product for message transfer, based on the method described above.

Another embodiment of the present invention provides a computer system for message transfer, based on the method described above.

DETAILED DESCRIPTION

Most modern vehicles are humanized in design to include many personalized features such as: electronic car seats with powered adjustments, electronic mirror adjustments, gear shifting control as well as many other novel functions.

It is common for a vehicle owner to permit others to drive his vehicle. Common examples include: a valet driver, lending one's vehicle to their child (of driving age), a close friend, or even renting one's vehicle to a stranger.

Biometrics refers to the measuring and analyzing of certain human physiological or behavioral characteristics for authentication or identification purposes using various instruments. Biometrics can be applied for both verification and identification purposes. Biometric verification, verifies a person is who they claim to be, while biometric identification determines who the person is based on a measured biometric factor. There are many characteristics that can be used for biometric identification, such as, fingerprints, irises, voice patterns, facial geometry, DNA, etc.

Fingerprints are a common biometrics system, as it is generally accepted that fingerprints are unique to an individual. A person's actual fingerprints do not change throughout the life of the specific individual. The primary dermal ridges form the actual pattern of the fingerprint unique to each individual. The fingerprint itself is static however the size and shape may vary with age.

Fingerprint recognition refers to an automated method of identifying or verifying the identity of an individual based on the comparison of 2 fingerprints. Specifically, fingerprint identification, verifies the identity of a person by matching a fingerprint against a database of known fingerprints. In addition to one's identity, a fingerprint may also determine a person's general age and their gender, based on a person's fingerprint ridge width.

Embodiments of the present invention provide systems and methods to automatically determine who is driving the vehicle, using personal identification, with the possibility of imposing driving restrictions on the driver, if the driver is unknown, or automatically adjusting the vehicle to a known driver's preferences.

Figure 1:
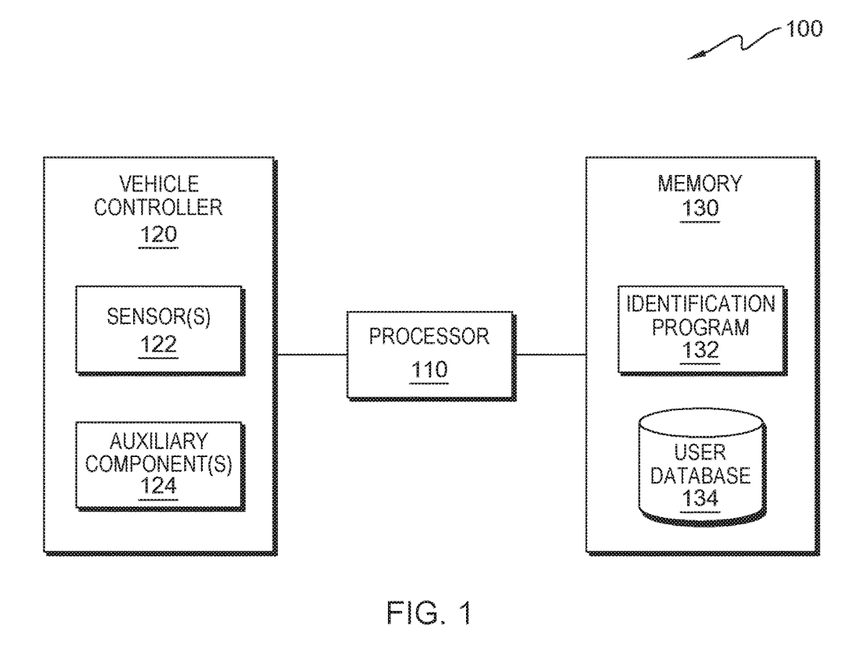
FIG. 1 is a functional block diagram illustrating a biometric identification system, in accordance with an embodiment of the present invention.

The present invention will now be described in detail with reference to the Figures. FIG. 1 is a functional block diagram depicting environment 100, in accordance with one embodiment of the present invention. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

Throughout this specification, environment 100 is the inside of a vehicle, such as a car, sports utility vehicle, minivan, and truck. However, environment 100 is not limited to vehicles; rather the term vehicles is considered to include in addition to the above, airplanes, boats, buses, trains, blimps, helicopters, etc.

In the depicted embodiment, environment 100 includes vehicle controller 120, and memory 130, interconnected by processor 110. Processor 110 is discussed below with reference to FIG. 3.

Vehicle controller 120 includes sensor 122 and auxiliary component(s) 124. In this exemplary embodiment, vehicle controller 120 allows the vehicle to start responsive to pushing a button.

In this exemplary embodiment, sensors 122 is a biometric identification system for use in a vehicle. Specifically, sensor 122 is a sensor module capable of detecting various properties and characteristics of the driver of the vehicle. Sensor 122 may be any sensor technology known in the art with the ability to acquire one's finger print. For example, sensor 122 may include an optical reader, a capacitive reader, an ultrasound reader, a thermal reader, etc. In one embodiment, sensor 122 is an optical reader, and takes a visual image of the fingerprint. In another embodiment, sensor 122 is a capacitive reader and utilizes capacitors to create an electrical current, based on the actual user's finger. In yet another embodiment, sensor 122 is an ultrasound reader, and transmits a high frequency sound wave to penetrate the epidermal layer of the skin, thereby eliminating any cuts or scars on one's skin, to acquire an accurate reading. In another embodiment, sensor 122 is a thermal reader and is highly sensitive to determine temperature differences between the ridges that make up one's fingerprint. Alternative embodiments of a fingerprint reader known in the art, can be utilized as sensor 122.

Alternatively, sensor 122 may be any sensor technology known in the art with the ability to acquire biometric identification of the user. There are many additional characteristics that can be used for biometric identification, such as, irises, voice patterns, facial geometry, DNA, etc.

In an exemplary embodiment, sensor 122 is installed in a user friendly location and coupled to vehicle controller 120. For example, sensor 122 may be installed on the steering wheel, the vehicle instrument panel, or the gear shifter. Additionally, sensor 122 may be installed within the engine start button for both starting the vehicle by pushing a button as well as scanning the users finger.

Auxiliary component(s) 124, include various peripheral elements associated with vehicle controller 120. Auxiliary component(s) 124 may include various systems which provide input and/or output to identification program 132. In the exemplary embodiment, auxiliary component(s) 124 may include such peripheral items as a global positioning system (GPS), Bluetooth, satellite radio, etc. Alternatively, auxiliary component(s) 124 may not exist in an embodiment of the invention. Additional auxiliary component(s) 124 may be included by those skilled in the art.

Memory 130 includes identification program 132 and user database 134. Memory 130 may include any suitable volatile or non-volatile computer readable storage media, and may include random access memory (RAM) and cache memory (not depicted in FIG. 1). Identification program 132 may be stored in a persistent storage component (not depicted) for execution and/or access by one or more of processor(s) 110 via one or more memories of memory 130. Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information.

Identification program 132 analyzes data from sensor 122, user database 134, and auxiliary component(s) 124, if equipped, to determine whether the driver is known as well as adjusts various vehicle settings. Identification program 132 analyzes sensor 122 data and searches for a biometric match of the user. Specifically, identification program 132 evaluates biometric information to determine if the driver is known to the vehicle. For example, identification program 132 evaluates the image of the finger to determine if the driver is known to the vehicle. The vehicles driver identification is confirmed by comparing their biometric pattern (from sensor 122) to patterns on record, within user database 134. Identification program 132 may derive the approximate age and gender of the user through the user's biometric information via sensor 122.

Additionally, identification program 132 may draw on various features of auxiliary component(s) 124. For example, in one exemplary embodiment, if auxiliary component(s) 124 includes a GPS unit, it allows identification program 132 to learn the location of the vehicle as well as the posted speed limit for the street vehicle on. In another exemplary embodiment, if auxiliary component(s) 124 includes Bluetooth, then identification program 132, may automatically sync the drivers mobile phone to the vehicles Bluetooth even when other mobile phones are detected. Once the user's mobile phone is connected via Bluetooth, identification program 132 may utilize music playlists on mobile device and/or hands free capabilities if the user receives a phone call while operating the vehicle. Auxiliary component(s) 124 may also include a means to connect to a network, providing identification program 132 with a larger database of potential user fingerprints.

User database 134 is a repository for data received from sensor 122, and vehicle settings. User database 134 can be implemented using any database architecture known in the art. User database 134 stores all information received from sensor 122 data as well as a user's approximate age, known users preferred vehicle settings, and/or unknown user settings based on various age ranges. While depicted on memory 130 in FIG. 1, user database 134 may reside on a localized server, remote server, or a "cloud" of computers interconnected by one or more networks utilizing clustered computers and components to act as a single pool of seamless resources.

In an alternative embodiment (not shown in environment 100), user database 134 may be located on a server connected to sensor 122 over a network. The network may be implemented on a number of types of networks such as, a local area network (LAN), an intranet, a wide area network (WAN), such as the Internet, a virtual local area network (VLAN), the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between a server and sensor 122.

Figure 2:
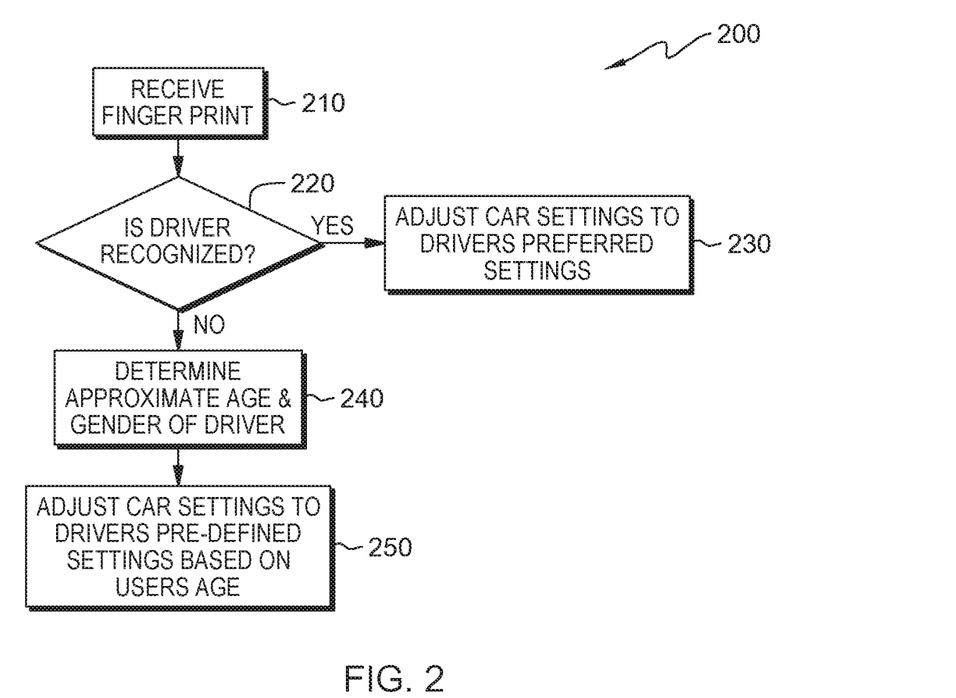
FIG. 2 is a flowchart illustrating operational steps for determining a user of a vehicle, in accordance with an embodiment of the present invention.

FIG. 2 depicts exemplary flowchart 200 illustrating operational steps of identification program 132 for determining and adjusting vehicle settings, in accordance with an embodiment of the present invention.

In step 210, identification program 132 receives, from sensor 122, electronic data associated with a user. In this exemplary embodiment, identification program 132 receives electronic data representing the fingerprint of the user of a vehicle, in response to a finger being placed on sensor 122. The person seeking access to a vehicle, or wanting to start the vehicle, does so by first placing a finger over sensor 122. In general, there are two common methods of acquiring a fingerprint. Sensor 122 may utilize either the swipe or touch method. For example, a swipe reader has a small contact surface whereby the user swipes his finger over sensor 122.

Alternatively, a touch sensor requires a user to press and release the entire fingerprint over sensor 122. The user's fingerprint is captured and transmitted. Sensor 122 detects and captures the user's fingerprint and transmits electronic data representing the fingerprint to identification program 132. In an alternative embodiment, identification program 132 receives electronic data representing the fingerprint of the user of a vehicle from user database 134.

In step 220, identification program 132 determines if the user is recognized. In this exemplary embodiment, identification program 132 compares the user's fingerprint to all user fingerprints stored in user database 134. Identification program 132 utilizes a matching algorithm to compare previously stored templates of fingerprints against the candidate fingerprint for authentication purposes. In the exemplary embodiment, identification program utilizes a minutiae matching, whereby the algorithm recognizes minutiae points on the user's fingerprint and attempts to find matching minutiae points of fingers within user database 134. In an alternative embodiment, identification program 132 utilizes a pattern matching, whereby the algorithm compares the entire fingerprint image to that of each and every fingerprint within user database 134. Alternative algorithms known by those skilled in the art may be used.

It is understood that in step 220, a database of approved users is already created. Specifically, a vehicle owner has already established a collection of approved vehicle users and their corresponding fingerprints stored in user database 134.

If, in step 220, identification program 132 recognizes the driver of the vehicle, then, in step 230, the vehicle automatically adjusts all the various settings to that user's specific preference. Therefore, once the identity is determined, the users profile may be initiated. Exemplary embodiments of identification program 132 users profile include but not limited to adjusting all adjustable settings as predetermined by the user. Various predetermined settings may include, adjustments to a specific seat positions, steering wheel position, exterior mirror position, as well as a specific climate control temperature settings, stereo presets, and engine output specifications. Additionally, in another exemplary embodiment, if auxiliary component 124 is a Bluetooth hands free driving system, identification program 132, may know which mobile phone is the drivers, and automatically connect to the specific phone if other phones are present in the vehicle, in addition to automatically adjusting to the driver's preferred seating position, side mirrors, etc. Additional settings may include controlling various engine parameters such as, max speed, sports mode, suspension/tuning variations, etc.

If, in step 220, identification program 132 does not recognize the user of the vehicle, then in step 240, identification program 132 determines the approximate age and gender of the user. In an exemplary embodiment, identification program 132 utilizes an algorithm to derive the age of the user as well as the gender of the user. For example, identification program 132 may utilize Wavelet Transform and Singular Value Decomposition algorithms to determine the age and gender of the user. In one exemplary embodiment, identification program 132, determines approximate age based on 5 different age brackets: up to 12 years old, 13 through 19 years old, 20 through 25 years old, 26 through 35 years old, and over 36 years of age. Therefore, once the approximate age and gender of the user is derived, identification program 132 may then automatically adjusts various settings as predetermined by the vehicle owner.

In step 250, identification program 132 adjusts various vehicle settings to predefined settings in response to determining the age and gender of the user. In this exemplary embodiment, pre-defined settings based on the age and gender of a user are stored in user database 134. For example, settings may include controlling various engine parameters such as, max speed, sports mode, suspension/tuning variations, etc. Settings may also be limited based on various auxiliary components 124. For example, if the vehicle has a GPS, then the GPS may provide maximum allowable speed based on the roadway the vehicle is on.

In an exemplary embodiment, identification program 132 may impose differing driving restrictions on unknown drivers of different ages. For instance, younger drivers may have limited available engine power, as well as a governor limiting their maximum obtainable speed; while older drivers may have less driving restrictions. For example, if an auxiliary component 124 is a GPS, identification program 132 may limit the maximum allowable speed of teenage drivers (persons of legal driving age younger than 20) to the posted speed limit, while adults (persons over 26 years old) may have maximum allowable speed of 10 miles per hour (MPH) over the posted speed limit on city roadways and no maximum allowable speed on highways. In another example, identification program 132 may restrict a teenage driver to the posted speed limit on city roadways and allow for an increase in speed on highways.

In another embodiment, a new driver mode may be initiated. For example, a new driver mode may include a valet setting. Upon activating a valet setting, identification program 132 may limit the vehicle top speed to that associated with parking a vehicle. For example, if identification program 132 determines the valet driver is a teenager, the top vehicle speed may be restricted to 10 MPH, while an adult may have the vehicle speed restricted to 25 MPH.

In this exemplary embodiment, identification program 132 may adjust various vehicle settings based on the user's approximate age and gender. For example, user database 134 may contain national height averages for persons within specific age gaps. Therefore, identification program 132 may access the information and automatically adjust the driver's seat, steering wheel, and side mirrors to an approximate location based on one's gender within a specific age range.

Identification program 132 may also limit specific radio stations, music general, and speaker volume, based on the driver's age and/or gender.

In another embodiment, identification program 132 may connect to an auxiliary system such as third party server. For example, identification program 132 may adjust various other vehicle settings based on the user's approximate age and gender. For example, user database 134 may be connected to an insurance system, through an auxiliary component 124 server, which dictates specific restrictions and/or limitations for drivers of a certain gender and age. Therefore, identification program 132 may impose various restrictions on the driver, as dictated by the owner's insurance policy. For instance, if the driver is a 16 year old male, the insurance company might limit him to a predetermined acceleration limit, whereas a 16 year old female might have a different acceleration limit.

In another example, if the owner of the vehicle is a car rental company, identification program 132 may be linked to only the driver who rented the car. Under this scenario, the rental car company can better guarantee that only the individual who rented the vehicle is able to drive. In an alternative embodiment, identification program 132 may restrict rental car drivers to be 26 years of age or older.

Therefore, if identification program 132 determines the driver is under 26 years of age, then identification program 132 may significantly limit the maximum speed of the rental car vehicle.

Accordingly, by preforming the operational steps of flowchart 200, identification program 132, utilizing a biometric identification system, may link the driver of a vehicle to certain performance and handling profiles; while at the same time, customizing the driving experience for the owner of the vehicle and designated alternative drivers.

Figure 3:
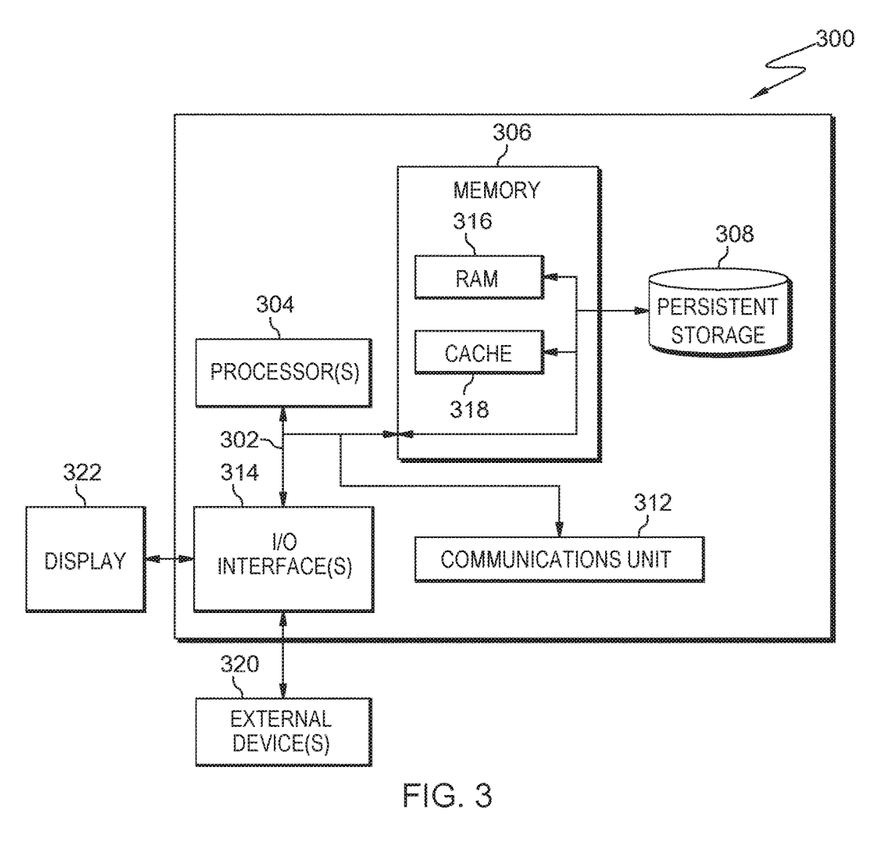
FIG. 3 is a block diagram of the internal and external components of a computer system, in accordance with an embodiment of the present invention.

Reference is now made to FIG. 3. FIG. 3 is a block diagram of internal and external components of a computer system 300, which is representative the computer systems of FIG. 1, in accordance with an embodiment of the present invention. It should be appreciated that FIG. 3 provides only an illustration of one implementation and does not imply any limitations with regard to the environments in which different embodiments may be implemented. In general, the components illustrated in FIG. 3 are representative of any electronic device capable of executing machine-readable program instructions. Examples of computer systems, environments, and/or configurations that may be represented by the components illustrated in FIG. 3 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 300 includes communications fabric 302, which provides for communications between one or more processors 304, memory 306, persistent storage 308, communications unit 312, and one or more input/output (I/O) interfaces 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 316 and cache memory 318. In general, memory 306 can include any suitable volatile or non-volatile computer readable storage media. Software (e.g., identification program 132, etc.) is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 312 provides for communications with other computer systems or devices via a network (e.g., network 140). In this exemplary embodiment, communications unit 312 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to server 150 through communications unit 312 (e.g., via the Internet, a local area network or other wide area network). From communications unit 312, the software and data can be loaded onto persistent storage 308.

One or more I/O interfaces 314 allow for input and output of data with other devices that may be connected to computer system 300. For example, I/O interface 314 can provide a connection to one or more external devices 320 such as a keyboard, computer mouse, touch screen, virtual keyboard, touch pad, pointing device, or other human interface devices. External devices 320 can also include portable computer readable storage media such as, for example, thumb drives, portable optical or magnetic disks, and memory cards. I/O interface 314 also connects to display 322.

Display 322 provides a mechanism to display data to a user and can be, for example, a computer monitor. Display 322 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   determining, by one or more processors, a type of roadway associated with a current location of a vehicle, and an age and a gender of the user of the vehicle, based on identifying information, wherein determining the age and the gender of the user of the vehicle further comprises:
   receiving, by one or more processors, biometric information associated with the user from one or more sensors within the vehicle, wherein a first sensor obtains fingerprint information of the user of the vehicle;
   determining, by one or more processors, whether the biometric information associated with the user of the vehicle, received from the first sensor corresponds with an identity of a user included in a database;
   responsive to determining that the biometric information associated with the user, received from the first sensor, does not correspond with an identity of a user included in the database, determining, by one or more processors, a gender and an approximate age of the unidentified user of the vehicle based on analyzing the received biometric information from the first sensor utilizing Wavelet Transform and Singular Value Decomposition algorithms; and
   applying, by one or more processors, a limitation on a set of vehicle setting ranges, wherein the limitation is based in part on the approximate age of the unidentified user of the vehicle, the gender of the unidentified user of the vehicle, and the determined type of roadway.

2. The method of claim 1, further comprising:
in response to determining the identifying information from the user of the vehicle is similar to a set of stored identifying information, activating, by one or more processors, a driving profile, wherein the driving profile comprises a set of vehicle settings associated with the set of stored identifying information.

3. The method of claim 2, wherein activating the driving profile further comprises adjusting, at least one of:
a seat of the vehicle, a radio of the vehicle, a set of side mirrors of the vehicle, a predetermined climate control of the vehicle, a steering wheel of the vehicle, a suspension of the vehicle, an engine output of the vehicle, and a transmission of the vehicle.

4. The method of claim 1, further comprising:
transmitting, by one or more processors, the determined approximate age and gender of the unidentified user of the vehicle to a third party, wherein the third party is a rental company that owns the vehicle; and
responsive to transmitting the determined approximate age and gender of the unidentified user of the vehicle to a third party, receiving, from the third party, a third party driving profile that is applied to the vehicle, wherein the third party driving profile further affects operating the vehicle by the unidentified user.

5. The method of claim 1, further comprising:
adjusting the set of vehicle setting ranges, based on a received speed limit, wherein adjusting the set of vehicle setting ranges limits a maximum speed of the vehicle.

6. The method of claim 1, further comprising:
determining, by one or more processors, that another driving mode is activated for the vehicle, wherein the other driving mode is a valet mode associated with parking the vehicle;
determining, by one or more processors, based on receiving biometric information from the first sensor, an approximate age of the valet driver; and
dictating, by one or more processors, a maximum speed value for the vehicle based on the activation of the valet mode and the approximate age of the valet driver.

7. The method of claim 1, wherein analyzing the received biometric information from the first sensor utilizing the Wavelet Transform and Singular Value Decomposition algorithms to determine the gender and the approximate age of the unidentified user of the vehicle, determines a range of ages for the unidentified user.

8. A computer system comprising:
one or more computer processors;
one or more computer readable storage media;
program instructions stored on the one or more computer readable storage media for execution by at least one of the one or more processors, the program instructions comprising:
program instructions to determine a type of roadway associated with a current location of a vehicle, and an age and a gender of the user of the vehicle, based on identifying information, wherein program instructions to determine the age and the gender of the user of the vehicle further comprise:
program instructions to receive biometric information associated with the user from one or more sensors within the vehicle, wherein a first sensor obtains fingerprint information of the user of the vehicle;
program instructions to determine whether the biometric information associated with the user of the vehicle, received from the first sensor, corresponds with an identity of a user included in a database;
responsive to determining that the biometric information associated with the user, received from the first sensor, does not correspond with an identity of a user included in the database, program instructions to determine a gender and an approximate age of the unidentified user of the vehicle based on analyzing the received biometric information from the first sensor utilizing Wavelet Transform and Singular Value Decomposition algorithms; and
program instructions to apply a limitation on a set of vehicle setting ranges, wherein the limitation is based in part on the approximate age of the unidentified user of the vehicle, the gender of the unidentified user of the vehicle, and the determined type of roadway.

9. The computer system of claim 8, further comprising:
in response to the program instructions determining the identifying information from the user of the vehicle is similar to a set of stored identifying information, program instructions to activate a driving profile, wherein the driving profile comprises a set of vehicle settings associated with the set of stored identifying information.

10. The computer system of claim 9, wherein program instructions to activate the driving profile further comprises program instructions to adjust, at least one of:
a seat of the vehicle, a radio of the vehicle, a set of side mirrors of the vehicle, a predetermined climate control of the vehicle, a steering wheel of the vehicle, a suspension of the vehicle, an engine output of the vehicle, and a transmission of the vehicle.

11. The computer system of claim 8, further comprising:
program instructions to transmit the determined approximate age and gender of the unidentified user of the vehicle to a third party, wherein the third party is a rental company that owns the vehicle; and
responsive to transmitting the determined approximate age and gender of the unidentified user of the vehicle to a third party to a third party, program instructions to receive, from the third party, a third party driving profile that is applied to the vehicle, wherein the third party driving profile further affects operating the vehicle by the unidentified user.

12. The computer system of claim 8, further comprising:
program instructions to adjust the set of vehicle setting ranges, based on a received speed limit, wherein adjusting the set of vehicle setting ranges limits a maximum speed of the vehicle.

13. The computer system of claim 8, further comprising:
program instructions to determine that another driving mode is activated for the vehicle, wherein the other driving mode is a valet mode associated with parking the vehicle;
program instructions to determine, based on receiving biometric information from the first sensor, an approximate age of the valet driver; and
program instructions to dictate a maximum speed value for the vehicle based on the activation of the valet mode and the approximate age of the valet driver.

* * * * *